United States Patent [19]
Werjefelt

[11] 4,440,164
[45] Apr. 3, 1984

[54] LIFE SUPPORT SYSTEM AND METHOD OF PROVIDING FRESH AIR TO ENCLOSED AREAS

[76] Inventor: Bertil Werjefelt, 277 Kaha St., Kailua, Hi. 96734

[21] Appl. No.: 228,940

[22] Filed: Jan. 27, 1981

Related U.S. Application Data

[63] Continuation-in-part of Ser. No. 73,612, Sep. 10, 1979, and a continuation-in-part of Ser. No. 185,962, Sep. 10, 1980.

[51] Int. Cl.³ .............................................. A62B 7/00
[52] U.S. Cl. .......................... 128/205.25; 128/202.13; 128/205.17
[58] Field of Search ......... 128/200.24, 201.22–201.29, 128/202.11, 202.13, 202.19, 204.18, 205.25, 206.12, 206.27, 206.28, 207.12, 202.27, 205.24, 205.26, 205.28, 206.15, 206.21, 204.15, 204.17, 200.28, 201.15; 98/1.5, 2.12, 2.13, 2, 2.16, 44, 35, 33 R, 64, 13, 18; 244/118.5; 251/353

[56] References Cited

U.S. PATENT DOCUMENTS

| | | | |
|---|---|---|---|
| 642,166 | 1/1900 | Sherman | 128/201.29 |
| 879,391 | 2/1908 | Leonard | 128/201.23 |
| 909,979 | 1/1909 | Zerkle | 128/207.12 |
| 1,007,644 | 10/1911 | Cocke | 128/207.12 |
| 1,129,619 | 2/1915 | Zapf | 128/205.26 |
| 2,058,659 | 10/1936 | Bellanca | 244/118.5 |
| 4,320,756 | 3/1982 | Holmes | 128/206.12 |

FOREIGN PATENT DOCUMENTS

| | | | |
|---|---|---|---|
| 787697 | 6/1968 | Canada | 128/207.12 |
| 435916 | 10/1926 | Fed. Rep. of Germany | 128/205.17 |
| 741127 | 12/1932 | France | 128/202.11 |
| 438980 | 11/1935 | United Kingdom | 128/205.13 |
| 793452 | 4/1958 | United Kingdom | 128/205.25 |

OTHER PUBLICATIONS

Fire ... an Advertisement for Vivat, (apparently 1982).
A Protective Passenger Smoke Hood–A Publication of the Federal Aviation Administration–AM 67-4–Apr. 1967.

*Primary Examiner*—Henry J. Recla
*Attorney, Agent, or Firm*—Sandler & Greenblum

[57] ABSTRACT

A life support system is provided for users located within enclosed areas to supply them with fresh air from a location exterior of the enclosed area, and is particularly adapted for use in emergency circumstances such as when fire and smoke fill enclosed areas. The system can be used in buildings and in aircraft and can be adapted for use with the gasper outlets presently employed on aircraft. A method for providing fresh exterior air to the enclosed area and the user includes conducting the air to an outlet for the exterior air which is located within the area, conducting the exterior air from the outlet to at least one breathing cavity of the user, and preventing the user from inhaling ambient atmosphere from within the enclosed area.

18 Claims, 6 Drawing Figures

LIFE SUPPORT SYSTEM AND METHOD OF PROVIDING FRESH AIR TO ENCLOSED AREAS

This application is a continuation-in-part of U.S. patent application Ser. No. 73,612, filed on Sept. 10, 1979, and U.S. patent application Ser. No. 185,962, filed on Sept. 10, 1980. The subject matter of both of these applications is expressly incorporated by reference herein.

BACKGROUND OF THE INVENTION

1. Field of the Invention

The present invention generally relates to a new and improved emergency life support system for use in providing users in enclosed areas with exterior fresh air, and more particularly to a new and improved emergency life support system and method of providing fresh air which include a breathing mask, a source of exterior air, and means for attaching the mask and source of fresh air to enable people in enclosed areas to survive during dangerous and/or emergency conditions. The system can either be portable or permanently affixed to an exterior air supply.

2. Discussion of Prior Art

In various enclosed areas, e.g., vehicles such as airplanes, as well as hotels and other buildings, hazardous and occasionally deadly conditions arise under emergency situations. These often occur as the result of fires in buildings or aircraft which create the presence of toxic and lethal fumes. Injuries and fatalities relating to these fires are often attributed to asphyxiation rather than burning. While such dangerous conditions can occur in all enclosed areas, some of the most complex and hazardous circumstances arise in flight on board aircraft. Personnel and passengers have no escape route and generally inadequate supplies of firefighting equipment. Additionally, present ventilation equipment and emergency oxygen equipment do not serve to significantly dilute or reduce toxic agents which are present in a smoke filled aircraft cabin.

Recent accidents have caused the death of numerous passengers and crew members aboard aircraft in which fires have broken out, even though the airplanes were able to land. This is due to the limited amount of oxygen available within a cabin once noxious and other dangerous fumes enter the enclosed cabin area. Existing oxygen supply systems, several of which are described in the patents discussed hereinafter, are inadequate to provide a significant displacement or dilution of toxic agents under such circumstances, because they will permit the fumes from a cabin to be directly inspired into the oxygen masks of passengers and crew members. Even when passengers and crew members are able to satisfactorily evacuate an aircraft in a fire or other emergency, it has been found that such safe escape or evacuation can take upwards of ten minutes, dependent upon the damage and obstructions which exist and the coordination among the passengers and crew. In one recent case, a jet airliner landed four minutes after fire was discovered on board the aircraft, yet most of the crew and passengers were already asphyxiated from the hazardous fumes on board. Another airliner recently made a successful landing in only twenty minutes after fire was discovered on board, and there were no survivors, all deaths being attributed, upon an initial investigation, to similar asphyxiation. In most cases, at conventional altitudes, the occupants of aircrafts cannot open windows for ventilation in order to receive air exterior to the aircraft, although at lower altitudes there are some methods which are known for ventilating aircraft by opening doors during flight.

In firefighting situations, it has been known to provide firemen and other firefighting personnel with the use of compressed air or oxygen. Although this method has proven effective when the users have access to appropriate protective garmets, it is not a practical method for use by the general public in enclosed areas, either in aviation or non-aviation environments. It is clear that this problem relates both to enclosed stationary structures, e.g., buildings, as well as moveable aircraft, but it is also clear that problems relating to smoke, fire, and noxious fumes on board an aircraft, where there is little access to fresh (conditioned) air from a location exterior to the aircraft, are far more dangerous.

Even though by law, most passenger aircraft are equipped with an emergency oxygen system, i.e., oxygen masks attached to pressurized oxygen containers, such systems are unsuitable and not recommended for use in the event of fire or smoke. On one hand, conventional emergency aircraft oxygen systems only supply a limited quantity of oxygen, e.g., three minutes, for fully occupied aircraft. Secondly, the oxygen which is supplied is intended to augment and enrich the air which is available in the aircraft, and therefore, through an oxygen mask, aircraft personnel (other than the cockpit crew, who generally have access to pure oxygen) and passengers are supplied mainly ambient cabin air in conjunction with the oxygen. These systems are intended and designed mainly for situations in which there are sudden and rapid losses of cabin pressure. None of these systems provide a simple method of ventilating the interior of an aircraft cabin with fresh or conditioned air from the exterior of the aircraft. "Conditioned air" is understood in the industry, and used in this application, as referring to pressure and temperature controlled fresh air brought in from the exterior of the aircraft. "Fresh air", "exterior air", and "conditioned air" are used interchangeably herein. As expressly referred to in the applications of which this application is a continuation-in-part, the air supplied can either be bleed air or ram air.

In fact, the Civil Aeronautics Board, in a recent brochure, recommends that if there is fire or smoke in a cabin, the recommended passenger procedure is to lie down and place a cloth over their faces to minimize the inhalation of noxious and other fumes.

Accordingly, despite laws and regulations which require that all pressurized aircraft have emergency oxygen equipment for sudden depressurization of aircraft cabins, and that portable oxygen equipment be provided for emergency use by crew members and passengers, particularly in first aid situations such as cardiac arrests, there is no present apparatus for providing protection for passengers and crew members within an aircraft cabin in the event of smoke or fire on board the aircraft. This is true even though fire extinguishers and lifevests are provided for passenger safety during emergencies such as fire and emergency water landings.

Nor do the patented devices which relate to the protection of firemen, other workers and aircraft passengers and crew members provide protection in the event of fire or smoke within an aircraft cabin.

RENTSCH, German Patent No. 1,139,747, discloses an automobile ventilation system which is intended to prevent a driver from inhaling carbon monoxide fumes while he is driving. The system includes a vent connected to air or oxygen outside of the automobile, a tube for conducting the air or oxygen vent to a mask, and the mask, which is placed on the user's nose so that he can avoid breathing in undesirable carbon monoxide.

CUPP, U.S. Pat. No. 2,655,150, discloses breathing apparatus for utilization on aircraft. It comprises a main mask body which includes sponge rubber spacer blocks, a rebreather bag formed of sheets and adapted to be provided with a supply of breathing fluid, e.g., compressed oxygen or air, and an inlet tube. The assembly is provided to a passenger who can unfold the mask and attach the inlet tube to a rubber tube at one end, the rubber tube then being attached to a supply of oxygen or air under pressure. The mask is held by a head band about the head of the passenger. The inward flow of compressed breathing fluid through the inlet tube causes the rebreather bag to become inflated prior to inhalation by the wearer. When the user begins to inhale, the rebreather bag partially collapses and ambient air passes inwardly through the porous walls of the mask to the user. Upon exhalation, the exhaled air passes outwardly through the porous mask walls and the rebreather bag is filled with oxygen from the inlet tube. The entire apparatus is designed to be formed from inexpensive plastic materials which can be conveniently disposed of after a single use.

PANIAN, U.S. Pat. No. 958,427, discloses apparatus for assisting firemen engaged in fighting fires in smoke-filled areas. A face mask is provided for placement on a user and is maintained thereon by a head strap. A hose is connected at a first end to the face mask and at a second end to a bellows and a chamber. Air from the free atmosphere adjacent a tube opening passes into a chamber and into the expanding bellows, air passing from a corresponding collapsing bellows into a second chamber into the tube and the mask. After inhalation, the air which is passed to the user is passed outwardly from the mask through exhaust ports. This provides the user with a source of fresh air exterior to the area in which he is fighting a fire in which noxious fumes may arise.

POTASH, U.S. Pat. No. 3,486,730, discloses a system for providing a passenger in an aircraft with oxygen. The system includes a protective mask and a hose connected to the mask and to a collective a protector. The protector includes a source of purified air which can be supplied or forced through a path which is formed by a hose, a coupling, a cannister, and a protective mask. A quick disconnected coupling is provided for allowing a user of the mask to quickly separate himself from the oxygen or pressurized air supply system.

NELSON, U.S. Pat. No. 3,347,566, discloses apparatus for allowing industrial workers to easily breath in atmospheres in which noxious or inflammable conditions exist. In such areas protective face masks are worn which are connected to flexible tubes or pipelines to convey to the mask, from a source exterior of the working area, either pure air or oxygen. The breathing fluid supply lines are generally flexible and are connected to a regulator which is attached to a harness on a worker. The device illustrated in this patent provides an easily detachable breakaway coupling assembly adapted to permit a fleeing worker to disconnect himself from the breathing tube and enable him to evacuate an area as rapidly as possible, even in situations in which he does not remember to positively disconnect himself from the fluid breathing system.

BLOOM et al., U.S. Pat. No. 3,158,153, disclose a generally conventional passenger oxygen mask assembly. An oxygen supply line is connected, via a tubing, to a flexible bag, which serves as an oxygen reservoir, as well as to a face mask, which is connected to the other end of the bag or reservoir. A valve is provided for mixing ambient cabin air from the aircraft with the oxygen fed via the supply line and tubing. The reservoir of oxygen maintained in the flexible bag provides an immediate oxygen supply to a user.

DARROW, U.S. Pat. No. 1,323,217, discloses a ventilating mask for use in hosiptals. The mask is adapted to be connected to tempered or conditioned air of the appropriate temperature and humidity which is delivered to a T-element from a source which is not illustrated. The air is then fed via tubing to the mask. This serves to provide individual patients in a hospital with a satisfactory ventilating system while preventing the surrounding, generally unsterile atmosphere from entering the breathing cavity of a patient.

HERMAN, U.S. Pat. No. 2,284,053, shows a generally conventional gas mask which provides a plurality of expandable bellows arrangements. The bellows device comprises either a rubber ball, an accordian-like generally cylindrical apparatus or a triangular-shaped accordian-like apparatus, all of which are designed to apply additional air to a gas mask. The device includes body attachment straps for both the face mask and the bellows portion.

SUMMARY OF THE INVENTION

Accordingly, it is a general object of the present invention to provide a new and improved life support system adapted for use in enclosed areas, particularly within aircraft cabins, and a method for conducting fresh exterior air to people exposed to smoke or fire within such enclosed areas.

It is a further object of the present invention to provide a new and improved life support system which can provide a continuous permanent supply of fresh air as well as a limited portable supply of fresh air to people exposed to an adverse environment comprised of toxic or lethal fumes.

Yet another object of the present invention is to provide a new and improved life support system which minimizes danager to people on board aircraft as well as those trapped in other enclosed environments in a simple and relatively inexpensive manner, which is additionally simple to operate and readily acceptable by government, industry and the public.

Still another object of the present invention is to provide a new and improved life support system for providing an emergency fresh air supply to occupants of aircraft during smoke or fire situations by providing apparatus as part of the system which is lightweight and which occupies a small storage area.

It is a further object of the present invention to provide a new and improved life support system for eliminating potentially lethal hazards which are associated with the use of compressed air or oxygen on board aircraft and within other enclosed areas.

Yet another object of the present invention is to provide a new and improved life support system which can be easily adapted for use in conjunction with existing aircraft in a relatively inexpensive manner. This object can be achieved by connecting existing ducted oxygen supply on board an aircraft to bleed air in order to supply passengers and cabin personnel with breathable fluid during emergency situations such as those detailed above.

Still another object of the present invention is to provide a new and improved life support system for use in commercial aircraft which can be adapted to incorporate presently used "gasper outlets", which supply conditioned air from an aircraft's duct system to individual air nozzles which are easily accessible to passengers and aircraft crew members.

Still a further object of the present invention is to provide a new and improved life support system adapted for use with an aircraft or other enclosed area in which apparatus for preventing the recirculation and entrance of undesirable cabin air is provided, by ensuring that only fresh air from an exterior location is supplied to the enclosed area when there is a hazardous condition within the area.

Accordingly, the above and other objects and advantages of the present invention are provided for in a first aspect by a life support system adapted for use with an aircraft. The system comprises a mask adapted to be placed over at least one breathing cavity of a user. The system also includes connecting means having one end attached to the mask and another end adapted to be fluidically connected to air exterior of said aircraft. The connecting means and mask comprise means to direct said exterior air to said mask. This system prevents the entrance of ambient cabin air into the mask and the user's breathing cavity.

The present invention is provided for in a second aspect thereof by a life support system which is adapted for use in an enclosed area. The system comprises a mask adapted to be placed over at least one breathing cavity of a user and connecting means which have one end attached to the mask and another end adapted to be fluidically connected to air exterior of the enclosed area. The connecting means and mask comprise means for directing the exterior air to the mask and user. The system prevents the entrance of ambient air within the enclosed area from entering the mask and the user's breathing cavity.

The present invention is provided for in a third aspect thereof by a method for providing fresh air located on the exterior of an enclosed area to a user located within the area. The method comprises conducting the exterior air to an air outlet within the area, conducting the exterior air from the outlet to at least one breathing cavity of the user, and preventing the user from inhaling the ambient atmosphere within said area.

BRIEF DESCRIPTION OF THE DRAWINGS

The above and other objects, features and advantages of the present invention will become more fully apparent to those of ordinary skill in the art to which this invention pertains, from the following detailed description, when considered in connection with the accompanying drawings in which like reference characters designate like or corresponding parts throughout the several views, and wherein.

DETAILED DESCRIPTION OF THE DRAWINGS

Figure 1:
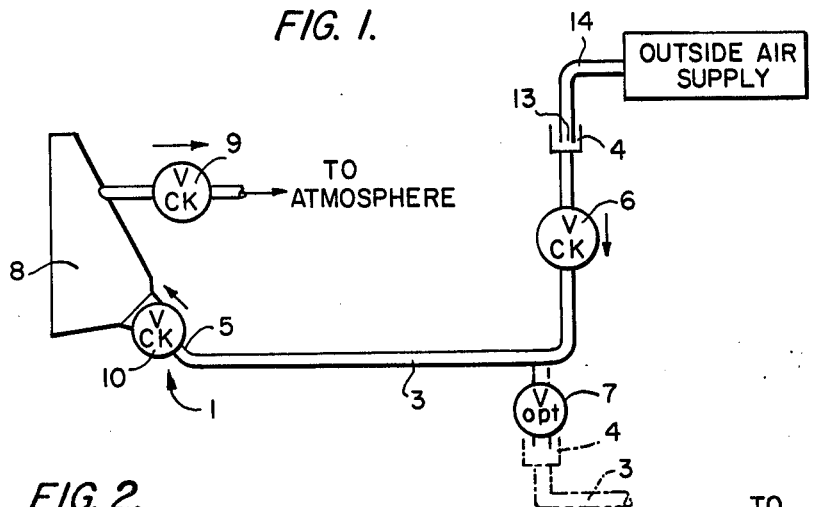
FIG. 1 is a schematic view of a basic life support system having a portable unit connected to an exterior air supply.
Figure 3:
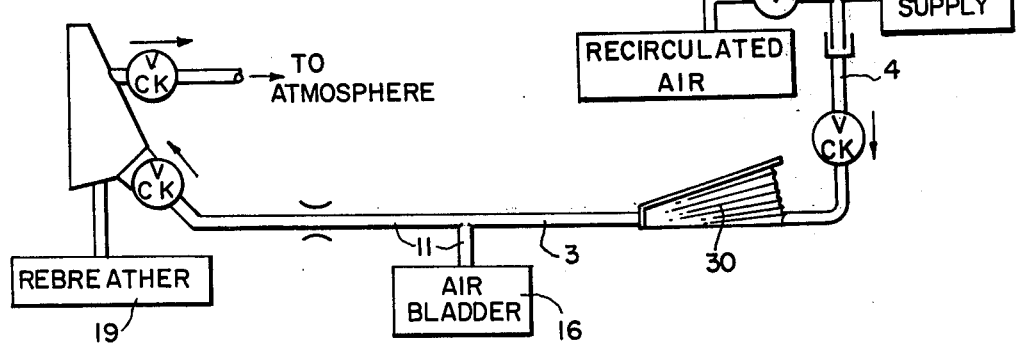
FIG. 3 is a schematic view of a portable unit connected to an exterior air supply and which includes a manual pump.
Figure 5:
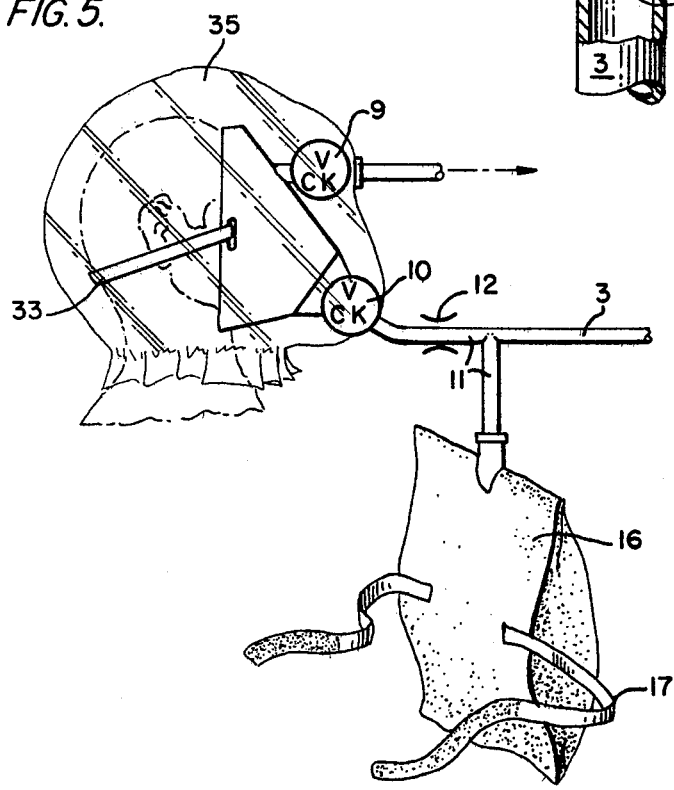
FIG. 5 is an overall view of a life support unit having a mask attachment with a hood, bladder, and attachment means.

Referring now more specifically to the drawings, FIG. 1 illustrates a life support system 1 formed in accordance with the present invention. It includes a first hose 3 having a first end 4 and a second end 5. The first end of the hose is adapted to be connected to a gasper outlet 13 or other conventional source of air presently available on an aircraft. It is important that the source of air be "conditioned" air which has been brought to the interior of the cabin or other enclosed area from the exterior of an aircraft or other enclosed area. It is also important that no ambient air from the enclosed area be drawn into the hose, as it is intended that the hose will conduct a source of fresh air to its second end 5, which can be connected to mask 8 which is placed over at least one breathing cavity of the user, and preferably over a user's nose and mouth. The hose can be either connected directly to the mask or via an intermediate hose 11 as shown in FIGS. 3 and 5. To have ambient cabin air enter the mask would defeat the purpose of the invention in supplying fresh air from a location exterior of an aircraft or other enclosed area to a user under emergency circumstances. For purposes of simplicity, the enclosed environment is hereinafter referred to as an aircraft cabin and the exterior air as being exterior to an aircraft, but it is understood that the description is equally applicable to any enclosed area and means for bringing in exterior air to users who are trapped in an enclosed area under emergency circumstances.

The mask is preferably equipped with two one-way flap or check valves, each operating in an opposed direction. Mask inlet valve 10 is provided adjacent either to the connection of second hose end 5 with the mask, or to the connection of an intermediate hose 11 (when used) positioned between hose 3 and the mask. This one-way valve allows inflow to the mask when air under pressure is supplied via either the gasper outlet 13 or other source of air. The gasper outlet is connected to aircraft ductwork 14. A mask outlet valve 9 is provided for exhaled air.

Figure 4:
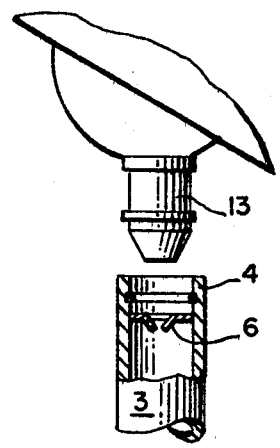
FIG. 4 is an enlarged view of a hose connection showing the operation of one example of a one-way valve connected to an exterior air supply.

Flap or check valve 6, positioned within hose 3 adjacent hose end 4, is best illustrated in FIG. 4. It is also a one-way valve of generally conventional construction. In the embodiment illustrated in FIG. 4, this valve is operable upon insertion of the hose or tube end 4 over a gasper or similar outlet to allow the inflow of air into the tube and towards the mask, and is automatically closed upon removal from the outlet in order to prevent ambient air from entering the tube.

Intermediate hose 11, shown positioned between hose 3 and the mask, need only be provided if a supplemental air container, e.g., collapsible bladder 16, is provided. If such a supplemental air container is not utilized as part of the life support system, hose 3 could directly connect the gasper outlet with the mask.

In some aircraft, the gasper outlet not only introduces air from exterior of the aircraft into the cabin but additionally recirculates the air which has been previously brought into the cabin. Under these circumstances, it will be necessary to include a recirculated air cutoff valve 15 within the ductwork 14 of the craft, as shown in FIG. 4, in order to prevent the reconditioned/recirculated air from flowing outwardly of the gasper outlet into the mask, so as to prevent any of the air containing noxious cabin fumes which have arisen due to the emergency circumstances, e.g., fire and/or smoke, from entering the mask.

Furthermore, in those circumstances in which the gasper outlet is utilized only to recirculate air previously introduced into the aircraft cabin and not to introduce air from the exterior of the aircraft to the cabin, the duct work itself will have to be provided with a valve or connecting device to which a hose similar to hose 3 can be connected. Under these circumstances, it may be necessary to more permanently attach the hose to the ductwork, unlike the connection between the gasper outlet and hose end 4, which is easily attachable and separable for purposes hereinafter to be described.

Figure 2:
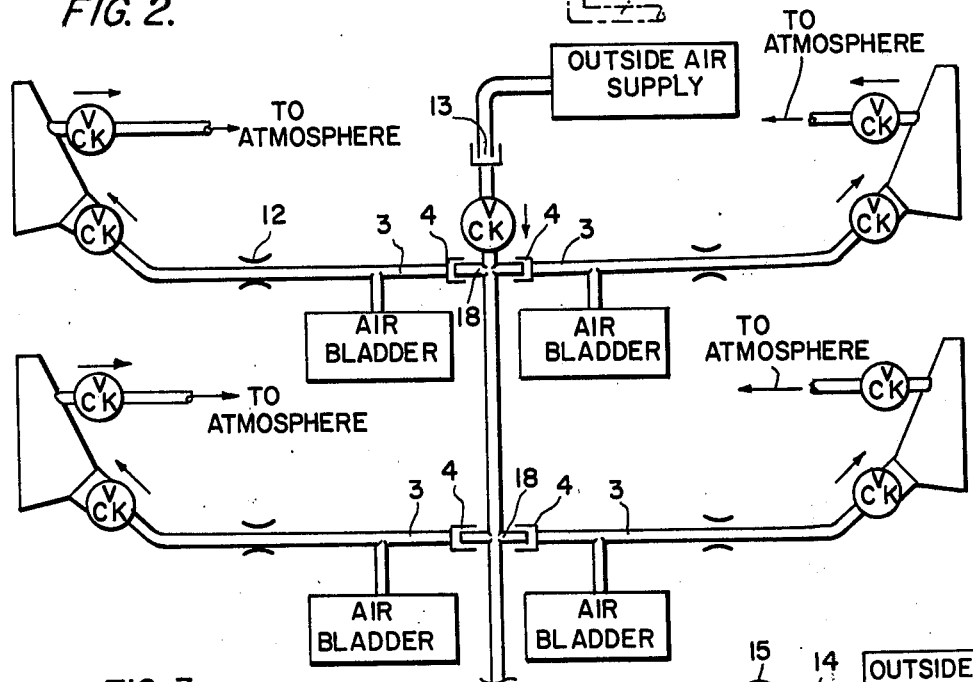
FIG. 2 is a schematic view showing a plurality of portable units connected to an exterior air supply.

In an alternate embodiment of the present device, as best illustrated in FIG. 2, a plurality of hoses 3 can be attached to one or more sources of air, e.g., gasper outlet 13, by an appropriate fluid connector 18, e.g., a manifold with a sufficient plurality of outlets to convert a single air outlet into a plurality of shared air outlets. Each hose 3 is fluidically connected to one gasper outlet 13 via the common manifold 18. In another contemplated embodiment, as shown in dashed lines in FIG. 1, each hose 3 can be provided with an optional, normally closed connector valve 7, to which an end A of an identical hose 3 can be connected, in a manner similar to that shown in FIG. 4. In this manner, an unlimited number of units can be connected without the necessity of using a common manifold or connector. This embodiment is especially useful in connecting one or more portable units to each other, when said units are disconnected from the external supply source.

Mask 8 can be provided with a mask outlet valve 9, as in FIGS. 1 and 5, which is presently contemplated as being a one-way flap or check valve which permits exhaled air from a user to exit the mask but which prevents the ambient air in an aircraft cabin from entering the mask. Alternately, the device could include a rebreather bag 19 for accepting exhaled gases from a user, which may become important in extending the period in which supplemental bladder 16 will provide portable air to a user after hose 3 has been detached from a source of air and it is desired to have an entirely portable source of air for a user.

Bladder 16 can be easily used to form a portable and supplemental source of air for a user which will supply him when it is necessary to move away from the more permanent source of air which is represented by gasper outlet 13.

The bladder can serve as a supplemental source of air when hose 3 is connected to a gasper outlet, or as a portable and single source of air when the hose is unconnected. When the hose is connected, air will rush through the hose, partially filling the bladder, which is found in an initially collapsed state, in an amount which is not drawn through mask inlet valve 10 by the user. When the user is exhaling, it is obvious that mask inlet valve 10 will prevent air from entering the mask and the bladder will attain a substantially filled state. Accordingly, when hose 3 is detached from a source of air exterior to the airplane and a user desires to move from a predetermined position, he will be able to carry a supply of air within the bladder which is generally sufficient to last for a period of 3 to 5 minutes. This will enble him to move to a different seat or area of an aircraft without discomfort or cessation of the breathing function.

As an alternative, a conventional life vest could be utilized as the storage bladder. This could be achieved by changing the conventional life vest, which is generally treated internally with a powder for eliminating adhesion of its internal surfaces, by substituting a non-toxic powder or eliminating the use of powder, so that the inflatable life vest could be utilized as a bladder and thereby serve as a supplemental source of air for a user.

Figure 6:
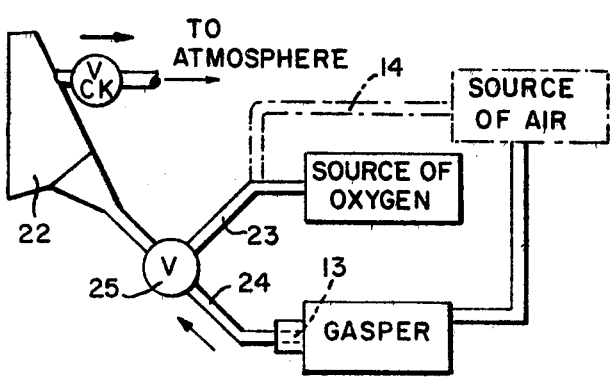
FIG. 6 is a schematic view of a life support unit utilizing the existing oxygen supply system of an aircraft.

One of the simplest embodiments of the present device is shown in FIG. 6, and involves utilization of a currently utilized oxygen mask 22, which is connected to a source of pressurized oxygen via line 23. As stated above, although this mask is unsuitable in its present condition for use during fires and smoke emergencies, due to ambient air inlet valve 25, which is provided to combine ambient cabin air with oxygen for use in depressurization situations, it is possible to take advantage of this structure in accordance with the present invention. This would be simply achieved by connecting the mask's ambient air inlet valve 25 to a hose, such as hose 24, at one end of the hose and connecting the other end of the hose to the gasper outlet. Although the mask and valve are shown schematically in FIG. 6, it is understood that conventional, generally cylindrical oxygen masks and ambient air inlet valve can be utilized by use of an appropriate connection between valve 25 and end of hose 24. In this fashion, a passenger or crew member would receive both oxygen and exterior air and could continue breathing normally. This would be an inexpensive and simple method of converting present aircraft to achieve the benefits of the system in accordance with the present invention.

Present emergency oxygen systems for passengers and crew members comprise either ducted systems which derive their oxygen from a central generator or storage cylinder, or individual chemical oxygen generators which are located in or near passenger seats. When the centrally ducted system is utilized, the pneumatic air supply can be connected to the oxygen supply duct system so as to maximize the use of the existing oxygen mask, at least for obtaining a continuous flow of fresh air, in view of the fact that only a relatively small storage bladder is provided with conventional oxygen masks; the bladder is generally insufficient for providing a portable air supply capable of lasting a user for an extended period of time. This is shown in dashed lines in FIG. 6. Because present oxygen masks utilize ambient air as a supplemental source, it will be necessary to supply fresh air from the exterior of the aircraft in a sufficient quantity so that a user will not have to open the valve on the oxygen mask which directs a supply of ambient cabin air to a user. Alternately, the ambient cabin air valve 25 can be provided with a mechanism to activate or deactivate said valve as circumstances of depressurization or excessive toxic fumes in the aircraft cabin may require.

While this connection will not adequately achieve the beneficial results of providing a portable air supply to cabin passengers, they will at least receive an emergency fresh air supply which is only limited in quantity by the function of compressors or turbines. It will be necessary, of course, to add control and activating mechanisms to properly connect the bleed or ram air supply system of the aircraft to the oxygen duct system in order to supply fresh air to the duct system.

An overall perspective view of a life support unit is illustrated in FIG. 5. This may include a pump 30, as shown in FIG. 3, positioned within hose 3 adjacent end 4. This pump is used in the event that a static air supply is to be delivered to mask 8, and can be simply a bellows, squeezable hollow rubber ball or other device which would be easily operable by a user. Additionally, mask strap 33 is provided for attaching the mask to a user's head, and bladder strap 17 for strapping or otherwise connecting bladder 16 to a user's body. A transparent hood 35 can form part of the apparatus in order to maintain smoke and fire away from a user's eyes and hair.

Although a hood is provided as one additional option to accompany the life support system, more material could be provided to protect other portions of the body, e.g., goggles.

It is preferable that at least a portion of the materials used should be high temperature and fire resistant materials, e.g., Kapton, a heat and fire resistant polyimide film which is manufactured by Dupont.

In operation, second hose end 4 is connected to gasper or other air outlet 13, which is in turn connected to a source of air exterior to an aircraft, so that a one-way flow of air will pass through valve 6, hose 3, intermediate hose 11 (where such hose is used), and into mask 8. If the optional supplemental air bladder 16 is provided, a portion of the air will also initially flow into this bladder. Valve 6, as discussed above, will automatically close off any supply of air through hose 3 when it is removed from the gasper outlet. Mask inlet valve 10 can be constructed so as to limit the amount of air which can escape from bladder 16 into mask 8, particularly under circumstances of excessive sudden or continuous pressure placed on the bladder. This is important in order to conserve the air supply in the bladder under emergency circumstances and when the hose is disconnected from the gasper outlet. If the mask inlet valve 10 is insufficient to prevent such escape of air from the bladder to the mask, a supplemental valve 12 can be positioned along the path between the bladder and the mask.

By designing bladder 16 to cover a user's torso, so that it will extend outwardly from the torso over a distance which is approximately between 10 and 20 centimeters, a portable air supply of between three and five minutes can be achieved. This will enable a user to connect, disconnect and/or reconnect the life support system to another supply source when necessary. Of course, the unit can be disconnected from a more permanent source of exterior air over a relatively prolonged period and still provide breathable air for the user, even though the surrounding environment is full of noxious fumes.

Optional pump 30 can have a conventional bellows configuration, as is commonly used for inflating air mattresses, and can be manually operated if desired to supply fresh air for storage purpose in bladder 16 or in circumstances in which there is a fresh air source but no motive pressure on the fresh air, so that it can assist a user's lungs in continuously supplying fresh air to the user. As described hereinabove, although in its preferred embodiment the present device should be easily separable from a source of fresh air, the source and hose can be permanently connected and installed in an aircraft or other enclosed area. In such permanent installations, a portable unit should be connected to an air supply duct upstream of the nozzle of the duct and should include an activating valve or mechanism, thereby providing for regular use of air which will be supplied through the nozzle.

For example, in non-aviation environments, a hotel can be provided with an emergency pneumatic air supply, e.g., a compressor and a generator can be positioned within an appropriate area and connected to a duct system or through elevator shafts or stairwells. This duct system could then be utilized to connect individual rooms, halls, or corridors, to air outlets. When using such systems, larger bladders for supplemental air supplies than bladder 16 could be provided to be worn by users. Any of the systems contemplated could incorporate temperature and smoke sensors, as well as interior and/or exterior pressure regulators. Furthermore, a fire and/or smoke alarm system as well as a fire sprinkler system could be incorporated as part of the overall device for system activation or other purposes. Additionally, the overall system may, of course, incorporate filtering or air purification means of appropriate type.

The device of the present invention can be stored in the seat pocket of an airplane in a plastic or other fire resistant pouch, under the seat or in overhead storage racks. If a permanent installation is to be made between the device and a source of air, an appropriate compartment should be provided, e.g., a compartment similar to that provided for present emergency oxygen masks on aircraft. In non-aviation enclosed areas, a portable unit can be sealed in a pouch and a requisite number of pouches be placed in individual rooms or hallways so that they are easily accessible in the event of emergencies.

While the system described herein can be easily utilized to provide fresh exterior air to aircraft passengers and personnel, it may also be possible to utilize a Venturi valve to reverse the pressurization system for the fresh air, in order to vacuum undesireable air or gas from the interior of a cabin so the passengers and crew may breath the remaining desireable atmosphere within the cabin. Devices other than venturi valves could be utilized in such alternative systems. Such devices including but not limited to devices for opening, during or aft/flite, the ports through which conditioned air is normally supplied when an aircraft is on the ground and not operating the on board pressurization and ventilation system. Opening these ports can be useful to increase either exterior airflow into a cabin or to increase the vacuum effect when sweeping air outwardly from a cabin. Such procedures must be performed at appropriate ambient air pressures.

From the above description, one skilled in the art can easily ascertain the essential characteristics of the invention, and without departing from the spirit and scope thereof, can make various changes and modifications of the invention to adapt it to various usages and conditions.

What is claimed is:

1. A life support system adapted for use in an aircraft having a pressurized cabin and an air supply system for conducting air from the exterior of said aircraft to the cabin within said aircraft, and wherein said air supply system includes at least one gasper outlet fluidically communicating with said cabin, said life support system comprising:
  (a) a mask adapted to be placed over at least one breathing cavity of a user, said mask comprising a temperature-resistant and fire-resistant material adapted to prevent noxious cabin fumes from entering said mask; and (b) connecting means including a first hose having one end attached to said mask, and another end comprising means adapted to be fluidically connected to a gasper outlet, said system comprising a supplemental air container attached to said hose, said container comprising means for receiving air from a gasper outlet and for retaining said air when said hose is separated from a gasper outlet in order to form a portable air source for a user, said mask and connecting means comprising means for directing said exterior air to said breathing cavity and for preventing the introduction of ambient air from said cabin into said cavity.

2. A system in accordance with claim 1 wherein said first hose is adapted to be separably connected to a gasper outlet within said cabin.

3. A system in accordance with claim 2 further comprising a connector attached to one gasper outlet and a plurality of hoses and masks including means for connecting said hoses and masks to said connector in order to fluidically communicate said gasper outlet with each of said masks via said connector and said hoses.

4. A system in accordance with claim 2 further comprising an intermediate hose connected to said mask.

5. A system in accordance with claim 4 wherein said supplemental air container comprises a supplemental air bladder and wherein said intermediate hose is also attached to said supplemental air bladder.

6. A system in accordance with claim 5 further comprising means for detachably securing said mask and said bladder to said user.

7. A system in accordance with claim 4 further comprising a one-way inlet valve positioned within said first hose adjacent to the end of said hose which is separably connected to said gasper outlet within the cabin.

8. A system in accordance with claim 7 wherein said mask includes a one-way inlet valve for receiving said exterior air and a one-way outlet valve provided for passing exhaled gases from a user into said cabin.

9. A system in accordance with claim 8 further comprising a rebreather bag connected to said mask for receiving exhaled gases.

10. A system in accordance with claim 7 further comprising a pump adjacent the end of said hose which is attached to said gasper outlet within the cabin.

11. A system in accordance with claim 2 wherein said mask is connected to a supply of oxygen.

12. A system in accordance with claim 11 wherein said mask includes an ambient cabin air inlet valve and wherein said first hose is attached to said ambient cabin air inlet valve on said mask.

13. A system in accordance with claim 2 wherein said system is used in conjunction with an aircraft, said aircraft including a valve for preventing recirculated air from entering said gasper outlet, said valve comprising part of said air supply system.

14. A system in accordance with claim 2 wherein said first hose includes a connector valve to engage one end of a second, identical life support system.

15. The system in accordance with claim 1 wherein said connecting means is also adapted to be connected to a supply of oxygen on said aircraft.

16. A system in accordance with claim 15 wherein said exterior air and said oxygen supply are joined by said connecting means.

17. A method of providing fresh air from the exterior of an aircraft having a pressurized cabin and an air supply system to a user located within said cabin, said method comprising:

(a) conducting said exterior air to at least one gasper outlet fluidically communicating with said cabin, said outlet comprising part of said air supply system and being located within said aircraft;

(b) conducting said exterior air from each of said at least one outlet to at least one breathing cavity of said user via a mask comprising a temperature-resistant and fire-resistant material and connecting means having one end attached to said mask and another end adapted to be fluidically connected to said gasper outlet, said exterior air being conducted to a user by attaching one end of a hose to a gasper outlet within said aircraft cabin, and another end of said hose to said mask, said mask adapted to be placed over at least one breathing cavity of a user, said method further comprising attaching said hose to a supplemental air container to thus provide the user with a portable source of air by filling the container with said exterior air from said outlet, and by then detaching said hose from said outlet; and (c) preventing said user from inhaling the ambient atmosphere within said aircraft.

18. A method in accordance with claim 17 further comprising a second intermediate hose, wherein said supplemental air container comprises a distinct air bladder said method further comprising attaching one of said hoses to said bladder and providing the user with a portable source of air by filling said bladder with said exterior air and detaching the first hose from said gasper outlet.

* * * * *

UNITED STATES PATENT AND TRADEMARK OFFICE
CERTIFICATE OF CORRECTION

PATENT NO. : 4,440,164
DATED : April 3, 1984
INVENTOR(S) : Bertil WERJEFELT

It is certified that error appears in the above-identified patent and that said Letters Patent is hereby corrected as shown below:

In column 3, line 50, delete "disconnected" and substitute ---disconnect---

In column 4, line 46, delete "danager" and substitute---danger---

In column 5, line 13, after "which" insert ---the---

In column 6, line 41, delete "flap" and substitute ---flaps---

In column 8, line 30, delete "valve" and substitute ---valves---

In column 8, line 35, delete "converting" and substitute ---altering---

In column 10, line 45, delete "flite" and substitute ---flight---

Signed and Sealed this

Sixteenth Day of October 1984

[SEAL]

Attest:

GERALD J. MOSSINGHOFF

Attesting Officer  Commissioner of Patents and Trademarks